United States Patent [19]
Burian et al.

[11] Patent Number: 5,785,078
[45] Date of Patent: Jul. 28, 1998

[54] SAFETY VENT HOUSING

[75] Inventors: William F. Burian, Downer's Grove, Ill.; Erling Mowatt-Larssen, Valparaiso, Ind.

[73] Assignees: Salco Products, Inc., Lemont; Gatx Corporation, Chicago, both of Ill.; a part interest

[21] Appl. No.: 803,014

[22] Filed: Feb. 21, 1997

[51] Int. Cl.⁶ .......................... F16K 17/40; F16K 17/14
[52] U.S. Cl. .................. 137/350; 137/68.23; 137/559; 137/590; 137/574; 105/358; 105/377.01
[58] Field of Search ................. 105/358, 377.01, 105/377.08, 392.5; 137/68.19, 68.21, 68.23, 350, 559, 315, 347, 590, 574; 251/367

[56] References Cited

U.S. PATENT DOCUMENTS

| | | | |
|---|---|---|---|
| 4,119,112 | 10/1978 | Adler | 137/68.23 |
| 4,183,370 | 1/1980 | Adler | 137/68.23 |
| 4,840,192 | 6/1989 | Yandle, II | |
| 4,889,160 | 12/1989 | Sheets | 105/358 |
| 4,913,184 | 4/1990 | Fallon | 137/68.19 |
| 4,938,247 | 7/1990 | Yandle, II | |

OTHER PUBLICATIONS

"Safety Vent Housing" Brochure (undated) issued by Salco Products.

*Primary Examiner*—S. Joseph Morano
*Attorney, Agent, or Firm*—Dorn, McEachran, Jambor & Keating

[57] ABSTRACT

A safety vent for a railroad tank car has a housing mounted about an opening on the top of the car. The housing body defines a cavity which contains a surge protector and a rupture disk. The rupture disk is designed to open at a known pressure and allow controlled venting of the pressure in the car. A securement cap threaded into the cavity centers the rupture disk in a seat formed in the surge protector. Removal of the securement cap provides quick, easy access to the rupture disk and surge protector for inspection and replacement without removing the housing body.

28 Claims, 3 Drawing Sheets

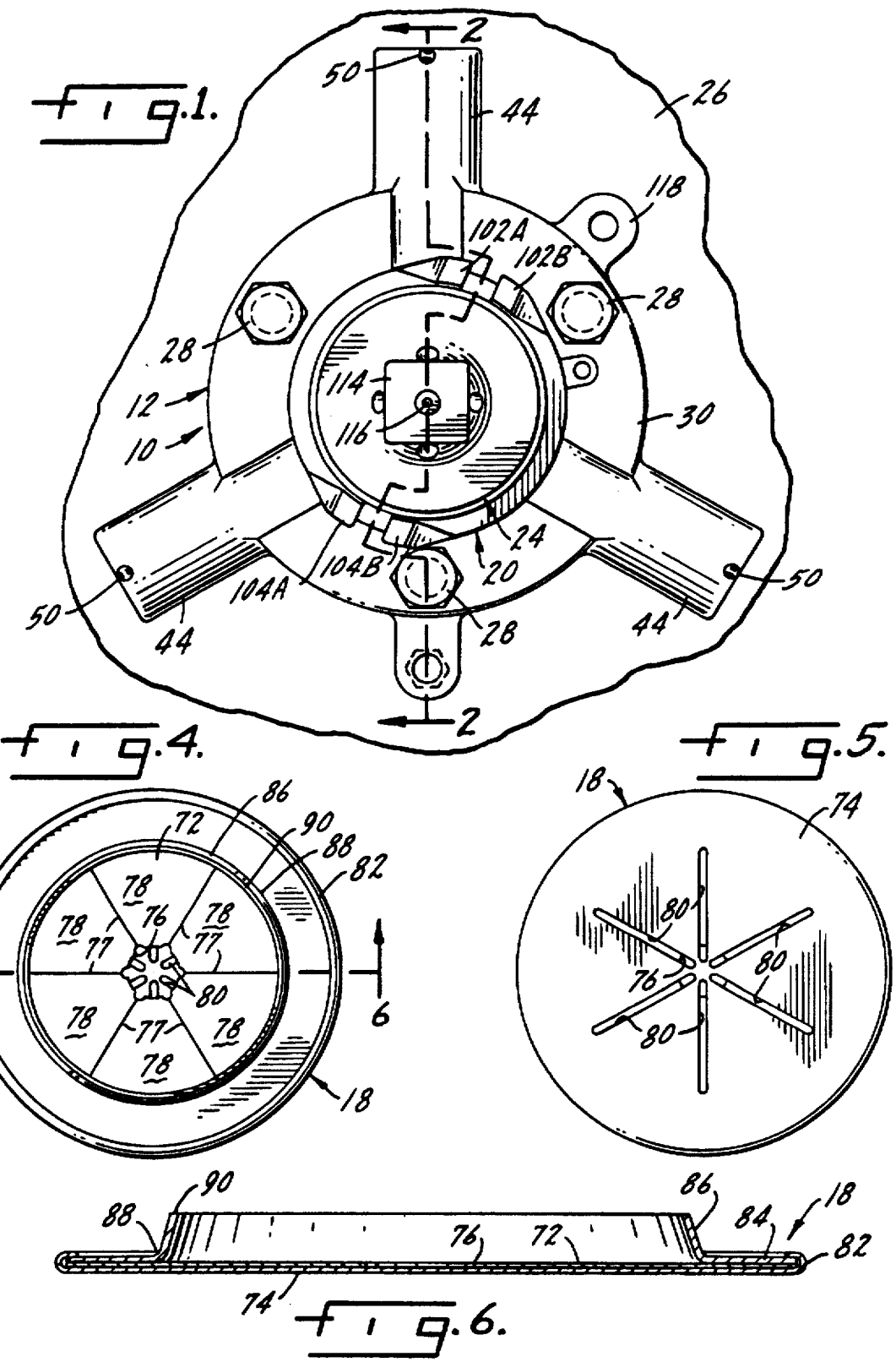

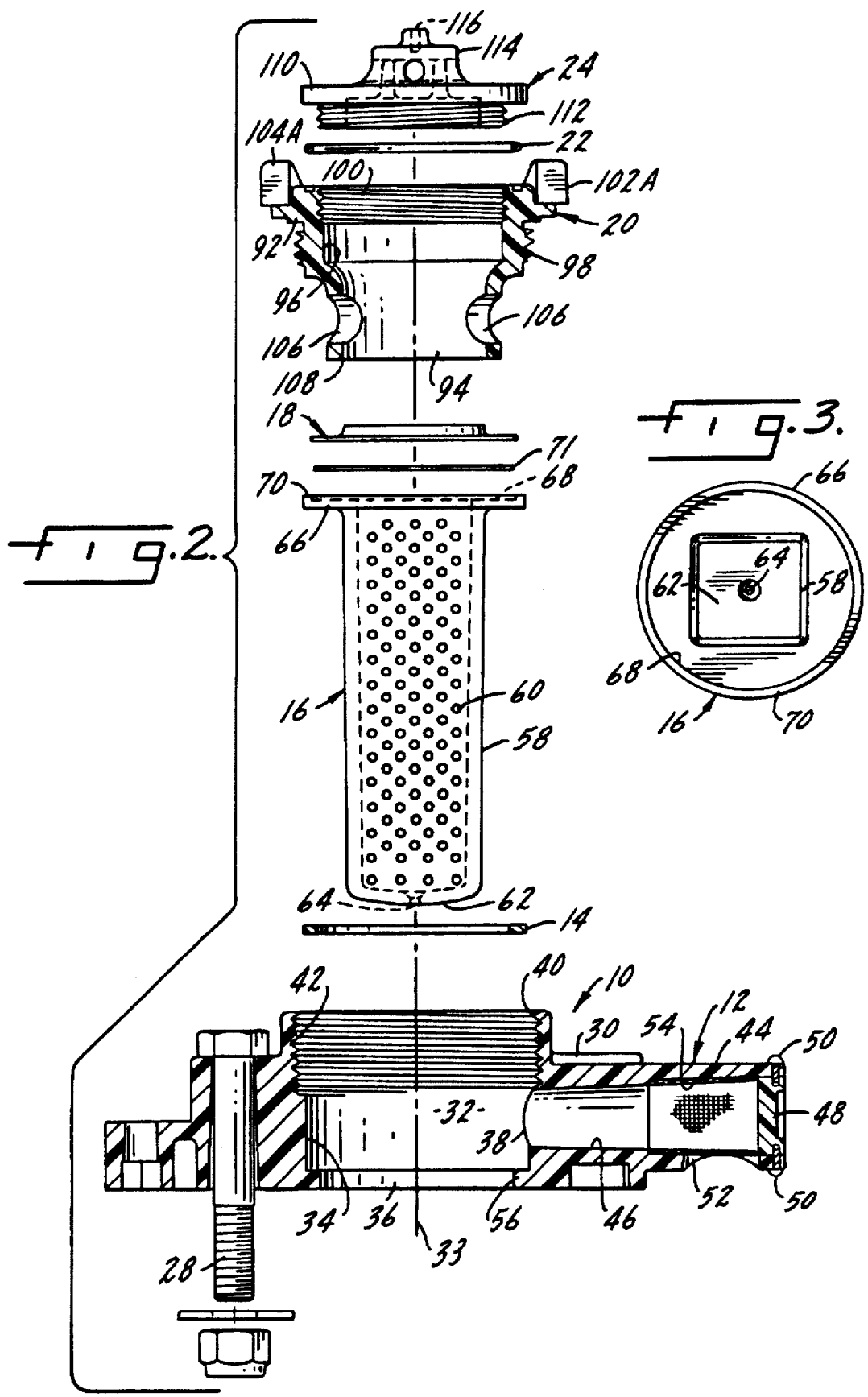

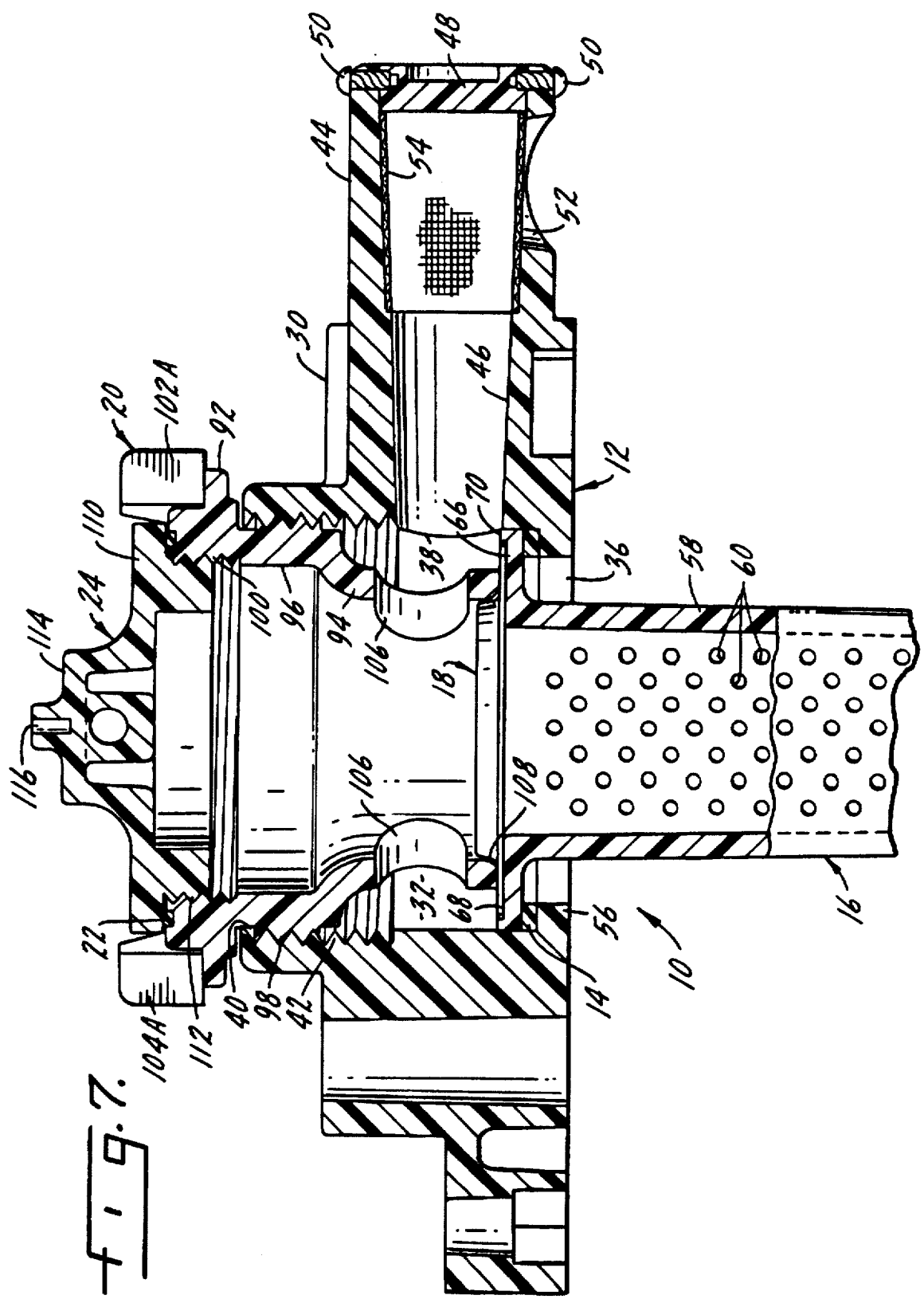

SAFETY VENT HOUSING

BACKGROUND OF THE INVENTION

Railroad tank cars are required to be equipped with a pressure relief device which will open in the event of a major pressure surge in the car. The purpose of the relief device is to open and vent major pressure surges in a controlled manner rather than risk damage to the tank car body or a catastrophic release of pressure. Major pressure surges, also sometimes known as hydraulic hammer, can be caused by sudden, abnormal shifting of the liquid contents of a car due to improper car handling, emergency braking or the like. The car body and relief device are designed to withstand minor pressure surges caused by normal car handling and movement. Shifting or sloshing of the liquid contents occurs because the tank cars are not permitted to be filled fully. Thus, there is some open space at the top of the car body, allowing for movement of the liquid within the car, which can compress the air (or other gas) at the top of the car and create a pressure surge.

In the past a commonly-used pressure relief device has been a safety relief valve. Such valves typically include a piston which is spring-biased against a seat formed in a housing. While safety valves serve the pressure relief function adequately they do so at a relatively high cost, both in terms of capital and operational expenses. Field testing of installed safety relief valves to assure they will operate as designed is a particular problem.

A more recent substitute for the safety relief valve has been the safety vent. This device is attached to the upper, flat surface of a flange on the end of a nozzle that extends from the top of the car body or cover. A frangible disk known as a rupture disk is placed across the top opening of the nozzle. The rupture disk is held in place by a housing which is bolted to the flange. The housing has passages which direct flow out from the nozzle in the event the rupture disks bursts due to a major pressure surge. An intact rupture disk normally blocks that flow path and seals against fluid flow. The disk is designed to burst when exposed to pressure in excess of a design limit, for example, 100 psi or 150 psi. A burst disk permits fluid to flow out of the nozzle through the passages in the vent housing, thereby relieving the pressure surge. However, the rupture disk will not return to its initial, closed condition once it is burst; it is a single-use item. Thus, the disks must be replaced after they have opened. Visual inspection of the condition of a rupture disk is permitted by a removable center plug threaded to the housing. But physical access to the disk for replacement can be had only by removing the entire housing.

Another prior art approach to pressure relief is the surge protector. This device has a housing similar to the safety vent housing but instead of a rupture disk at the top of the nozzle there is a surge protector. The surge protector is an elongated, hollow member that extends into the tank car nozzle. It is retained by the housing. The walls of the surge protector are perforated with numerous small holes. The holes effectively throttle flow of minor pressure surges to prevent discharge of fluid. However, should a major pressure surge occur the holes will permit the fluid to vent through the housing and relieve the pressure. Over time the holes of the surge protector may become clogged. To correct this, removal of the surge protector for cleaning or replacement is required. In the past this has required removal of the entire safety vent housing.

Another problem with both the surge protector and rupture disk type of safety vents has been effecting a reliable seal between the tank car nozzle's flange, the surge protector or rupture disk, and the safety vent housing. Any deterioration in the condition of the flange surface adversely impacts the ability to reseat the housing and surge protector or disk. Every time the disk is replaced the housing seal has to be remade, further complicating the matter.

SUMMARY OF THE INVENTION

The present invention relates to a pressure relief device for a railroad tank car. One of the objects of the invention is a safety vent having either a surge protector or a rupture disk or both in a housing which allows replacement of the surge protector or rupture disk without requiring removal of the housing.

Another object of the invention is a safety vent of the type described having quick, easy access to both the surge protector and rupture disk.

A further object of the invention is a safety vent wherein the surge protector and rupture disk can be simply dropped into a previously-installed housing and then secured in place by a screw-in securement cap.

Still another object of the invention is a safety vent wherein both the rupture disk and the surge protector are sealed within the housing such that replacement of these items does not require removal of the housing from the flange of the tank car nozzle or replacing the seal between the housing and nozzle.

Yet another object of the invention is a safety vent wherein the surge protector incorporates a seat for locating the rupture disk.

These and other objects which may become apparent in the following specification, drawings and claims are realized by a safety vent for a railroad tank car having a housing connectable to a flange on the top of a tank car. The housing includes a body portion with a cavity formed therein. The cavity defines a fluid flow path including an inlet and an outlet. The cavity also has an access port. A surge protector in the form of an elongated, hollow perforate member has a seat formed at one end. A shoulder formed in the body near the inlet supports the surge protector in the cavity with the seat disposed intermediate the inlet and outlet of the cavity. A rupture disk is shaped to fit in the seat of the surge protector. The rupture disk substantially blocks the fluid flow path under normal service conditions and opens to permit flow from the inlet to the outlet under abnormal pressure surge conditions. A securement cap having a collar is removably engageable with the access port of the housing. A skirt on the securement cap is engageable with the rupture disk to retain the disk in the seat formed in the surge protector. Removal of the securement cap provides access to the rupture disk and surge protector for inspection and replacement.

BRIEF DESCRIPTION OF THE DRAWINGS

FIG. 1 is a top plan view of the safety vent installed on top of a railroad tank car.

FIG. 2 is an exploded section taken along line 2—2 of FIG. 1.

FIG. 3 is a top plan view of the surge protector.

FIG. 4 is top plan view of the rupture disk.

FIG. 5 is a bottom plan view of the rupture disk.

FIG. 6 is a section taken along line 6—6 of FIG. 4.

FIG. 7 is a section similar to FIG. 2, showing the parts of the safety vent in an assembly.

DETAILED DESCRIPTION OF THE INVENTION

The safety vent of the present invention is shown generally at 10 in FIGS. 1, 2 and 7. As best seen in FIG. 2, the safety vent 10 includes a housing 12, a gasket 14, a surge protector 16, a rupture disk 18, a securement cap 20, an O-ring 22, and a top cap 24. Each of these components will now be described in detail.

The housing 12 is connectable to the tank car body. In most instances the housing will be attached to a flange affixed to the end of a nozzle. The nozzle is a hollow tube or pipe that extends upwardly from an opening in the top of the tank car body. A nozzle flange is shown at 26 in FIG. 1. Bolts 28 are provided for the purpose of fastening the safety vent housing 12 to the tank car body.

The housing 12 includes a body 30 which has a central cavity 32 defined by sidewall 34 extending therethrough. The cavity is a generally cylindrical passage through the body along the axis shown at 33. The cavity has an inlet 36 at the bottom portion of the body and at least one outlet 38 through the sidewall 34 of the body. The body 30 also defines an access port 40 near the upper end of the cavity 32. The sidewall 34 of the body is threaded near the access port 40 as shown at 42.

The housing further includes three equally-spaced arms 44 extending from the body 30. Each arm 44 has an internal passage 46 extending from an outlet 38 to an open outer end which is closed off by a plug 48. The plugs are retained by set screws 50. Apertures 52 formed in the underside of the arms 44 allow fluid to escape from the passages 46. Stainless steel screens 54 may be provided in the ends of the arms to prevent entry of insects, dirt or contaminants through the ports 52.

A retention means 56 is formed near the bottom of the cavity 32. In the preferred embodiment, the retention means takes the form of a shoulder extending around the inlet 36. It will be understood that other forms of retention means could be used. The retention means is sized such that the gasket 14 will rest on the upper surface of the shoulder 56.

Looking now at FIGS. 2 and 3, details of the surge protector 16 will be described. The surge protector is generally an elongated hollow perforate member. In the illustrated embodiment, there is a generally rectangular tube 58 with a plurality of holes 60 in at least two of the four walls of the tube section 58. A bottom wall 62 closes one end of the tube with an opening 64 in the bottom wall. A flange 66 is attached to the upper end of the tube 58. The flange 66 is generally circular and has an outside diameter just slightly less than the inside diameter of the cavity 32. Thus, the flange 66 is arranged to rest on the top surface of the gasket 14 where it is supported by the shoulder 56 of the housing 12. The upper surface of the flange 66 has a seat 68 formed therein. The seat is in the form of an indentation or recess in the flange which defines a rim 70 extending around the periphery of the flange. The rupture disk 18 is sized to fit into the seat 68 and be held by the rim 70. A thin gasket 71 (FIG. 2) may be placed in the seat 68 between the disk 18 and the flange 66.

Details of the rupture disk 18 are shown in FIGS. 4–6. The rupture disk comprises a generally planar plate and an upstanding annular wall. The plate is formed of upper and lower layers 72 and 74. Upper layer 72 is a disk-shaped member having a central cutout portion 76 (FIG. 4). Radial slits 77 extend from cutout 76 to define a plurality of segments 78. The lower layer 74 of the rupture disk plate has a plurality of radial slots 80. As can be seen in FIG. 4 the slots 80 are angularly displaced from the slits 77 such that the slots 80 underlie the center of the segments 78. The edges of the bottom layer 74 are turned over as at 82 and crimped against the outer portion of the wall to sandwich the upper layer 72 between the wall and lower layer 74, as best seen in FIG. 6. The wall 84 has an upstanding portion 86 which is tapered such that the proximal end 88 adjacent the plate layer 72 has a greater diameter than the distal end 90 of the upstanding portion 86. Preferably the rupture disk is made of stainless steel.

Turning now to FIGS. 2 and 7, the securement cap 20 includes a collar 92 and a depending, annular skirt 94. The securement cap has a bore 96 extending therethrough. The collar has exterior threads 98 and interior threads 100. Threads 98 mate with the threads 42 in the housing body to permit the securement cap 20 to be removably engageable with the housing 12. The collar 92 includes two pairs of lugs 102A, 102B and 104A, 104B. The lugs define a space between them which can receive a tool for turning the securement cap into and out of the housing. The skirt portion 94 has at least two openings 106 for permitting flow out of the bore 96.

The skirt further includes centering means for locating the rupture disk 18 on the seat 68 of the surge protector 16. The centering means comprises a radiused annular surface 108 formed at the free end of the skirt. The radiused surface has a diameter intermediate the proximal and distal diameters of the wall 86. Thus, the radiused surface 108 contacts the upstanding portion 86 of the wall 84 to interfit therewith in centering relation. This is best seen in FIG. 7.

The top cap 24 has a plate-like member 110 with threads 112 depending therefrom. Threads 112 of the top cap engage threads 100 of the securement cap to hold the top cap 24 in place. A central crown 114 on the top cap enables easier gripping for removal from the securement cap. A screw hole 116 can be used to secure a retention strap or the like (not shown) connected to a lug 118 (FIG. 1) to prevent loss of the top cap. The O-ring 22 fits between the member 110 and the collar 92 to prevent leakage out of the top cap.

The use, operation and function of the invention are as follows. When the safety vent is installed as shown in FIG. 7, the housing 12 is sealed against the tank car nozzle and generally prevents fluid flow out of the nozzle. The nozzle is in communication with the inlet 36 of the cavity 32. The gasket 14 prevents flow around the outside of the surge protector 16. Fluid flow must go through the apertures 60 in the surge protector to the interior of the tube 58. Flow from tube 58 into the interior of the securement cap 20 is normally prevented by the rupture disk 18. However, in the case of a major pressure surge, the pressure may burst the layers 72, 74 of the rupture disk and permit flow into the interior of the securement cap 20. From there fluid may flow through openings 106 in the skirt 94 and into the cavity 32. Fluid may exit the cavity through the outlets 38 into the arm passages 46 and out the downwardly directed ports 52. Thus, pressure is released in a controlled manner through the arms 44 of the safety vent 10.

Quick and easy inspection of the rupture disk can be had by simply unscrewing the top cap 24. The rupture disk 18 is visible through the hollow interior of the securement cap 20. If the rupture disk has burst as described above, the securement cap 20 is unscrewed from the access port 40 of the body 30. The spent rupture disk can then be removed from the seat 68 of the surge protector 16. A new one is dropped into place on the seat. Replacement of the securement cap will cause the radiused surface 108 to engage the wall 86 of the new rupture disk and center it in proper position. Once the securement cap is back in place, the top cap 24 is also put back into its position on top of the securement cap if it had been removed.

It can also be appreciated that inspection and/or replacement of the surge protector 16 is also readily accomplished by removing the securement cap 20 from the housing 12. The surge protector can be lifted off of the shoulder 56 and pulled out of the cavity 32 through the access port 40. The cleaned or new surge protector is then dropped in through the access port such that flange 66 engages shoulder 56 to hold the surge protector in position as seen in FIG. 7.

While a preferred form of the invention has been shown and described, it will be realized that alterations and modifications may be made thereto without departing from the scope of the following claims. For example, while the embodiment shown utilizes both a surge protector and rupture disk, the housing of the present invention could be used with either one of these separately. Thus, in the following claims the term flow restrictor will be understood to refer to either one or both of these items. Further, it will be understood that the flow restrictor means in the form of a surge protector will extend from within the body cavity to a point below the cavity. The flow restrictor need not be fully within the cavity.

We claim:

1. A safety vent for a railroad tank car, comprising:
a housing connectable to the tank car, the housing having a body with a cavity therein in fluid communication with an opening in the tank car, the cavity defining an access port and a fluid flow path including an inlet and an outlet;
flow restrictor means disposed in the cavity of the body for substantially blocking the fluid flow path under normal service conditions while permitting flow from the inlet to the outlet under abnormal pressure surge conditions, the flow restrictor means and access port being arranged such that the flow restrictor means can be placed into and removed from the cavity through the access port while the housing remains attached to the tank car; and
a securement cap removably engageable with the housing to selectively close or open the access port, the securement cap having a skirt which, when the securement cap is installed in the housing, is engageable with the flow restrictor means to prevent movement of said flow restrictor means toward the access port.

2. The safety vent of claim 1 further comprising retention means formed in the body of the housing for engaging the flow restrictor means and retaining the flow restrictor means at least partially in said cavity.

3. The safety vent of claim 2 wherein the retention means comprises a shoulder formed at the cavity inlet.

4. The safety vent of claim 3 wherein the flow restrictor means comprises a surge protector having a hollow perforate member and a flange at one end, the flange being engageable with the shoulder.

5. The safety vent of claim 4 further comprising a gasket disposed between the flange and shoulder.

6. The safety vent of claim 1 wherein the flow restrictor means comprises a rupture disk disposed in the cavity intermediate the inlet and outlet of the cavity.

7. The safety vent of claim 1 wherein the flow restrictor means comprises a surge protector having a hollow perforate member.

8. The safety vent of claim 1 wherein the flow restrictor means comprises a rupture disk disposed in the cavity intermediate the inlet and outlet of the cavity and a surge protector having a hollow perforate member.

9. The safety vent of claim 8 further comprising retention means formed in the body of the housing for engaging the flow restrictor means and retaining the flow restrictor means at least partially in said cavity.

10. The safety vent of claim 9 wherein the securement cap's skirt is engageable with the rupture disk to retain said disk between the skirt and retention means.

11. The safety vent of claim 8 further comprising a seat formed at one end of the surge protector and wherein the rupture disk is shaped to fit in the seat of the surge protector.

12. The safety vent of claim 11 wherein the skirt includes centering means for properly locating the rupture disk on the seat.

13. The safety vent of claim 12 wherein the skirt extends to a free end and the centering means comprises a radiused, annular surface formed at the free end of the skirt.

14. The safety vent of claim 13 wherein the rupture disk comprises a generally planar plate and an annular wall extending from a proximal end at the plate to a distal end spaced from the plate, the wall being tapered such that it has a larger diameter at the proximal end than at the distal end, and the radiused surface of the skirt has a diameter between those of the proximal and distal ends of the wall such that the radiused surface interfits with the wall in centering relation.

15. The safety vent of claim 1 further comprising a top cap removably joined to the securement cap.

16. The safety vent of claim 15 wherein the securement cap is a generally annular member with a central opening therethrough which provides visual access to the flow restrictor means when the top cap is removed.

17. The safety vent of claim 15 further comprising a seal between the top cap and the securement cap.

18. The safety vent of claim 1 wherein the housing further comprises at least one arm extending from the body, the arm having a passage therein in fluid communication with the cavity.

19. The safety vent of claim 1 wherein the skirt extends into the cavity and has openings therein to permit fluid communication between the inlet and outlet of the cavity.

20. The safety vent of claim 19 wherein the skirt is spaced from the body.

21. A safety vent for a railroad tank car, comprising:
a housing connectable to a tank car and having a body with an axial cavity which includes an inlet, an outlet and an access port, the inlet and access ports being on opposing sides of the body with the inlet facing the interior of the tank car and the access port facing the exterior of the tank car;
a surge protector having a perforate member disposed at least partially in the cavity;
retention means formed in the body of the housing adjacent to the inlet for supporting the surge protector in fluid communication with the cavity;
a rupture disk mounted in the cavity, the disk being formed so as to substantially block the fluid flow path from the inlet to the outlet under normal service conditions and to open and permit flow from the inlet to the outlet under abnormal pressure surge conditions;
the cavity and retention means being configured such that the rupture disk and surge protector can be installed and removed through the access port; and
a securement cap removably engageable with the housing and disposed in the access port to close off said port when installed and provide access to the rupture disk and surge protector when the securement cap is removed.

22. The safety vent of claim 21 wherein the securement cap further comprises a skirt engageable with the rupture disk to retain said disk in a fixed position.

23. The safety vent of claim 21 further comprising a top cap removably joined to the securement cap.

24. The safety vent of claim 23 wherein the securement cap is an annular member with a central opening therethrough which provides visual access to the rupture disk when the top cap is removed.

25. The safety vent of claim 21 wherein the securement cap comprises a collar removably engageable with the housing and a skirt engageable with the rupture disk, the skirt extending from the collar to a free end and having centering means for properly locating the rupture disk.

26. The safety vent of claim 25 wherein the centering means comprises a radiused, annular surface formed at the free end of the skirt.

27. The safety vent of claim 26 wherein the rupture disk comprises a generally planar plate and an annular wall extending from a proximal end at the plate to a distal end spaced from the plate, the wall being tapered such that it has a larger diameter at the proximal end than at the distal end, and the radiused surface of the skirt has a diameter between those of the proximal and distal ends of the wall such that the radiused surface interfits with the wall in centering relation.

28. The safety vent of claim 21 wherein the housing further comprises at least one arm extending from the body, the arm having a passage therein in fluid communication with the cavity.

* * * * *